US007242362B2

(12) United States Patent
Hulkkonen et al.

(10) Patent No.: US 7,242,362 B2
(45) Date of Patent: Jul. 10, 2007

(54) ANTENNA DOWN-TILTING

(75) Inventors: Jari Hulkkonen, Oulu (FI); Jyri K. Hämäläinen, Oulu (FI); Tero Korpi, Oulu (FI); Timo Kahkonen, Oulu (FI); Mikko Saily, Oulu (FI)

(73) Assignee: Nokia Corporation, Espoo (FI)

( * ) Notice: Subject to any disclaimer, the term of this patent is extended or adjusted under 35 U.S.C. 154(b) by 179 days.

(21) Appl. No.: 10/623,867

(22) Filed: Jul. 22, 2003

(65) Prior Publication Data

US 2004/0229651 A1 Nov. 18, 2004

(51) Int. Cl.
*H01Q 21/00* (2006.01)
*H04Q 7/20* (2006.01)

(52) U.S. Cl. ....................................... 343/853; 343/890

(58) Field of Classification Search ................ 343/844, 343/853, 890, 373, 815; 342/373; 455/447, 455/452.1
See application file for complete search history.

(56) References Cited

U.S. PATENT DOCUMENTS 6,268,828 B1 * 7/2001 Martek ....................... 342/373

* cited by examiner

*Primary Examiner*—Michael C. Wimer
(74) *Attorney, Agent, or Firm*—Squire, Sanders & Dempsey L.L.P.

(57) ABSTRACT

An antenna arrangement, and a method associated with such arrangement, including at least two antennas for providing radio coverage to a plurality of user equipment in a predetermined area of a mobile communications network. The at least two different antennas are arranged to have different vertical properties to thereby provide different radio coverage in the predetermined area. There is provided a plurality of frequencies for use in the predetermined area. The arrangement includes adjusting means for dynamically adjusting the transmission properties of at least one of the antennas based on the distribution of users within the cell and the frequency requirements for users within the cell. The arrangement further includes allocating means for dynamically allocating each user equipment to at least one group based on link characteristics of the user equipment.

29 Claims, 5 Drawing Sheets

ANTENNA DOWN-TILTING

BACKGROUND OF THE INVENTION

1. Field of the Invention

The invention relates to down-tiltable antennas in a sector or cell of a mobile communication network, and particularly but not exclusively to a GSM/EDGE mobile communication network.

2. Description of the Related Art

IN WCDMA (wideband code division multiple access) mobile communication networks, down-tilting of base station antennas is of crucial importance. This is due to the fact that inter-cell interference is one of the key factors in WCDMA performance because of the frequency reuse 1. In the current state of the art, it is proposed to build antennas in which the down-tilt can be changed using an electronic motor. In such an arrangement, network optimization can be achieved in a flexible manner, and costs associated with changing the tilt manually can be saved.

Finnish patent application number 20012473 proposes the use of two differently down-tiltable antennas in a WCDMA network. There is disclosed the provision of two antennas in a sector of a WCDMA cell, in which the down-tilt of both may be fixed, or one of both may be tiltable. The technique disclosed is particularly directed to solving a problem of WCDMA networks, where inter-cell interference can reduce the system performance markedly.

In GSM/EDGE networks, however, inter-cell interference depends on frequency planning. As such most of the specific benefits of tiltable antennas in WCDMA networks are not directly applicable to GSM/EDGE networks.

However, in multi-mode base stations there is a necessity to support both WCDMA and GSM/EDGE networks. As such the problem of simultaneously using down-tiltable antennas in both networks in an effective manner needs to be addressed. In the first instance, however, the problem of utilizing down-tiltable antennas effectively in a GSM/EDGE network needs to be addressed.

In a scenario of a multi-mode base station, both WCDMA and GSM/EDGE networks must be supported. Using a multi-mode base station, both WCDMA and GSM/EDGE signals may be transmitted through the same antenna or antennas. If the antenna is electronically down-tiltable and can be controlled by an operator to tilt the angle thereof, then a problem potentially arises. In order to control the inter-cell interference, from a WCDMA network perspective, the down-tilt may need to be increased. However, from the perspective of the GSM/EDGE network down-tilting of the antenna may severely limit the antenna coverage, which could create a more serious problem than the WCDMA inter-cell interference.

A simple solution to this problem is to provide separate physical antennas for use by each network. However if the properties and resources of the BTS and antennas are compatible, i.e. there is enough resource in the BTS for multi-antenna transmission and the antennas give proper gain in both WCDMA and GSM/EDGE frequency bands, then it is beneficial for any antenna to be used in both network implementations.

SUMMARY OF THE INVENTION

According to one embodiment of the invention, there is provided an antenna arrangement comprising at least two antennas for providing radio coverage to a plurality of user equipment in a predetermined area of a mobile communications network. The at least two different antennas are arranged to have different vertical properties to thereby provide different radio coverage in the predetermined area, and there being provided a plurality of frequencies for use in the predetermined area. The arrangement includes means for dynamically adjusting the transmission properties of at least one of the antennas in dependence on the distribution of users within the cell and the frequency requirements for users within the cell. The antenna arrangement further includes means for dynamically allocating each user equipment to at least one group in dependence on link characteristics of the user equipment.

The means for dynamically allocating the user equipment may be provided in a base station or radio network controller. The base station may monitor the uplink signals from each individual link through all antennas, and define certain parameters (i.e. link specific values). Based on some combination of these parameters, or based directly on the parameters, user equipment is preferably divided into groups, each group being served through at least one, and possible all, of the base station antennas. The grouping may also be based on control information received from the user equipment.

Preferably the antenna arrangement includes means adapted to dynamically allocate at least one frequency to each group.

Hence frequency allocation in the different groups may be controlled by the network, and is preferably optimized based on network parameters and varies from group to group. As such, frequency hopping lists, frequency reuse etc. may be different for different groups of user equipment.

According to one embodiment, there is a group associated with each of the at least two antennas. In such embodiment the at least two groups preferably correspond to a regular layer and super layer of an intelligent underlay-overlay arrangement.

At least one frequency is preferably dynamically allocated to each group. In a preferred embodiment, a plurality of frequencies are allocated to each group.

The plurality of frequencies may correspond respectively to a set of regular frequencies and a set of super frequencies. The above-mentioned intelligent frequency hopping functionality may be provided between the regular layer and the super layer.

The plurality of frequencies may be dynamically allocated to each group.

The vertical properties of the antennas may be different down-tilts or vertical antenna gain figures. The vertical properties of at least one of the antennas is preferably variable. The vertical properties are preferably variable in dependence upon the distribution of user equipment within the predetermined area.

The available frequencies may be allocated in dependence upon the load in a group. The load may be dependent upon the number of mobile stations in the group. The load may be dependent upon the interference characteristics within the group.

The frequency allocation to each antenna may be dynamically controlled by the network.

A channel may be allocated to a user equipment in dependence on a carrier-to-interference measurement. A channel may be allocated in dependence on a dynamic frequency and channel assignment.

The at least two antennas may both provide radio coverage to a user equipment. The user equipment may be allocated to at least two groups.

The down-tilt of at least one of the antennas may be fixed.

The predetermined area may be a cell. The predetermined area may be a sector of a cell.

A further embodiment of the invention provides a method of controlling an antenna arrangement including at least two antennas for providing radio coverage to a plurality of user equipment in a predetermined area of a mobile communications network. The method includes the steps of arranging the at least two different antennas to have different vertical properties to thereby provide different radio coverage in the predetermined area, providing a plurality of frequencies for use in the predetermined area, and dynamically adjusting the transmission properties of at least one of the antennas in dependence on the distribution of users within the cell and the frequency requirements for users within the cell. The method further includes the step of dynamically allocating each user equipment to at least one group in dependence on link characteristics of the user equipment.

The method may further include providing a group associated with each of the at least two antennas. The at least two groups preferably correspond to a regular layer and super layer of an intelligent underlay-overlay arrangement.

A plurality of frequencies may be allocated to each group. A plurality of frequencies correspond respectively to a set of regular frequencies and a set of super frequencies.

The method may further include the step of providing intelligent frequency hopping functionality between the regular layer and the super layer.

The vertical properties of at least one of the antennas may be variable. The vertical properties may be variable in dependence upon the distribution of user equipment within the predetermined area.

The available frequencies may be allocated in dependence upon the load in a group.

The method may further include allocating a channel to a user equipment in dependence on a carrier-to-interference measurement. A channel may be allocated in dependence on a dynamic frequency and channel assignment.

BRIEF DESCRIPTION OF THE DRAWINGS

For a better understanding of the invention and as to how the same can be carried into effect, reference will now be made by way of example to the accompanying drawings in which.

DESCRIPTION OF THE PREFERRED EMBODIMENTS

The invention is described herein with reference to a particular illustrative embodiment. However, such embodiment is presented for the purposes of illustrating the invention, and does not limit the scope thereof.

Figure 1:
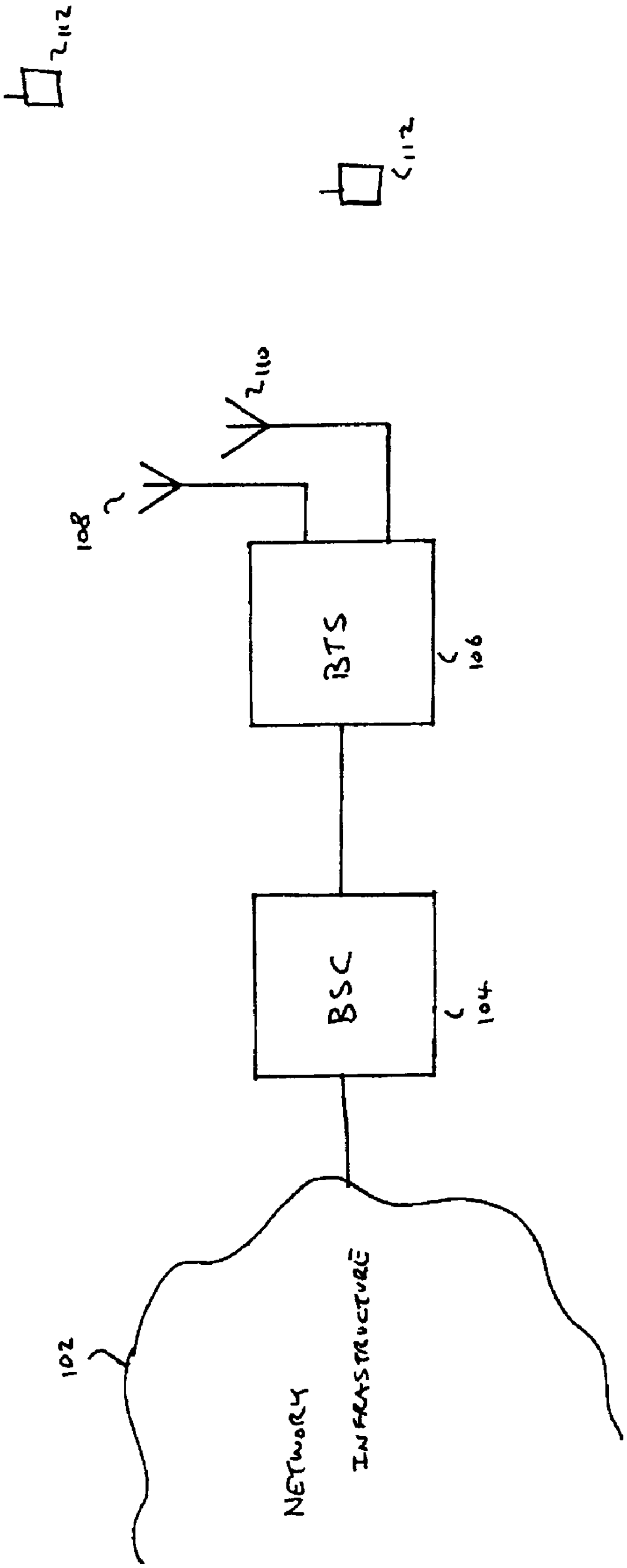
FIG. 1 illustrates an example embodiment of a GSM/EDGE network having a sector supported by two down-tiltable antennas.

The invention is specifically described herein with reference to an example of a GSM/EDGE network implementation in which a base transceiver station is associated with two antennas, each antenna having a different down-tilt. For the purposes of this example it is assumed that the two antennas provide radio coverage for a sector of a GSM/EDGE cell. Either or both of the two antennas may be dynamically down-tilted. Referring to FIG. 1, there is illustrated the main elements of the GSM/EDGE implementation in accordance with the described embodiment of the invention. Only those elements are shown which are necessary for placing the invention into a context for a proper understanding thereof. One skilled in the art will be familiar with the implementation of a GSM/EDGE network and associated infrastructure.

The GSM/EDGE network infrastructure is generally designated by reference numeral 102 in FIG. 1. A base station controller (BSC) 104 is connected into the network infrastructure 102, and further connected to control a base transceiver station (BTS) 106. In practice the BSC 104 controls many BTS's 106. In accordance with the described embodiment, the BTS 106 is associated with two antennas, designated by reference numerals 108 and 110. The two antennas are used for transmitting signals to, and receiving signals from, mobile stations in a sector of a GSM/EDGE cell. Such mobile stations are represented in FIG. 1 by the two mobile stations 112. The illustration of two antennas supporting a sector of a cell is for illustrative purposes only. Two or more antennas may support a cell, or two or more antenna arrays. Furthermore, the two antennas may provide radio coverage for the whole cell and not just a sector thereof.

Figure 2:
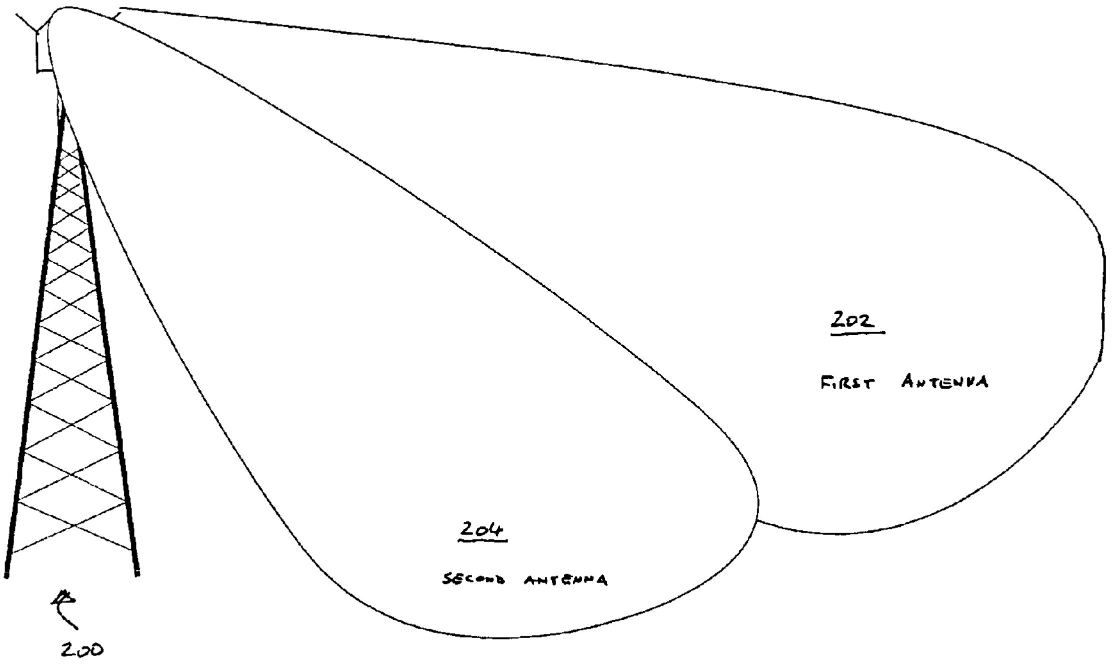
FIG. 2 represents the 3 dB gain curve of the antennas of the example network of FIG. 1 in the vertical plane.
Figure 3:
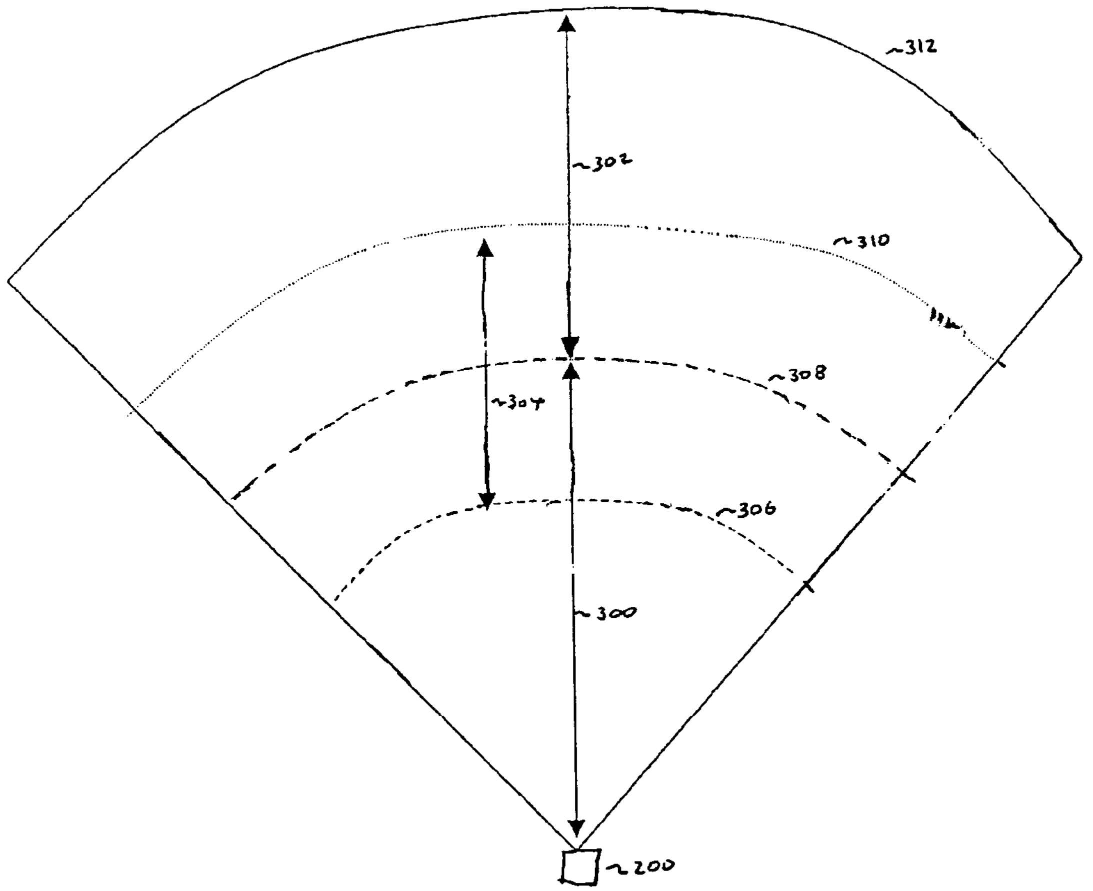
FIG. 3 represents the 3 dB gain curve of the antennas of the example network of FIG. 1 in the horizontal plane.

Referring to FIGS. 2 and 3, the main principles of the simple configuration of FIG. 1 utilizing two antennas in a sector having different down-tilts is further illustrated. FIG. 2 illustrates the 3 dB gain curve of the two antennas in the vertical plane, and FIG. 3 represents the 3 dB gain curve of the two antennas in the horizontal plane. For the purposes of the description, antenna 108 is referred to as the first antenna and antenna 110 is referred to as the second antenna.

Referring to FIG. 2, the down-tilt of an antenna is defined by the angle of the tilt from the vertical. Thus, referring to FIG. 2, the first antenna 108 has a small down-tilt, and the second antenna 110 has a relatively larger down-tilt. The 3 dB gain curve of the first antenna is represented by the gain curve 202 in FIG. 2, and the 3 dB gain curve of the second antenna is represented by the gain curve 204 in FIG. 2.

It should be noted that the 6 dB beam widths of each antenna are significantly broader than the 3 dB beams, which ensures that adequate beam overlapping is reached for diversity reception while still allowing the down-tilt control.

In FIG. 3, there is more clearly illustrated the effect of the different antenna down-tilting shown in FIG. 2 on the radio coverage in the sector. Referring to FIG. 3, the dash line 306 represents the maximum antenna gain of the second antenna 110, i.e. the antenna having the relatively larger down-tilt. The dash line identified by reference numeral 310 represents the maximum gain of the first antenna 108, i.e. the antenna having a relatively small down-tilt. The dash line 308 represents the point at which the gain of the first and second antennas is equal. The arrow 304 between the dash lines 306 and 310 represents an area of overlap, i.e. an area whereby there is provided coverage from both the first and second antenna. The arrow 302 between the dash line 308 and an outer line 312 represents the main area of coverage of the first antenna 108, which can be considered to be the radius of the outer sector. The arrow 300 between the antenna mast 200 and the dash line 308 represents the main radio coverage of the second antenna 110, and can be considered to be the radius of the inner sector. The radius of the inner sector 300 represents the limit of reliable coverage of the second antenna, and the radius of the outer sector 302 represents the limit of reliable coverage of the first antenna.

Thus, referring to FIG. 3, in the horizontal plane there is defined three areas of main radio coverage: an inner sector 300, a shared sector 304, and an outer sector 302. It will be appreciated by one skilled in the art that the boundaries of each of these sectors can be varied by controlling the down-tilt of each of the first and second antennas.

As will be understood by one skilled in the art, the first antenna 108 having a small down-tilt angle may preferably be used for transmissions on the broadcast control channel (BCCH), since the first antenna 108 offers a large radio coverage within the sector. Transmission on traffic channels (TCH) may be transmitted from either the first or second antenna, or even from both antennas, as appropriate—and as discussed further hereinbelow.

In accordance with one advantage of the invention, the frequencies available in a sector may be divided between the first and second antennas, and thus the first and second antennas may be used in frequency planning. Thus, different frequencies may be allocated to different parts of the sector. Frequencies may be allocated to the inner radius 300, the outer radius 302, or the shared radius 304. Frequencies allocated to the shared radius 304 may be used for transmission from both the first and second antennas.

As such, different numbers of frequencies can be used in frequency hopping (FH) in different parts of the sector. For example, a larger number of the available frequencies may be used in parts of the sector where the traffic load is particularly high. For example if traffic load is high in the center of the sector, then more frequencies may be utilized in the center of the sector. Alternatively if the traffic load is high in the edge of the cell, then more frequencies may be deployed at the cell edge. Thus, in the GSM/EDGE network of the described embodiment, antenna down-tilting can be advantageously coupled with both interference suppression and frequency planning.

Figure 4:
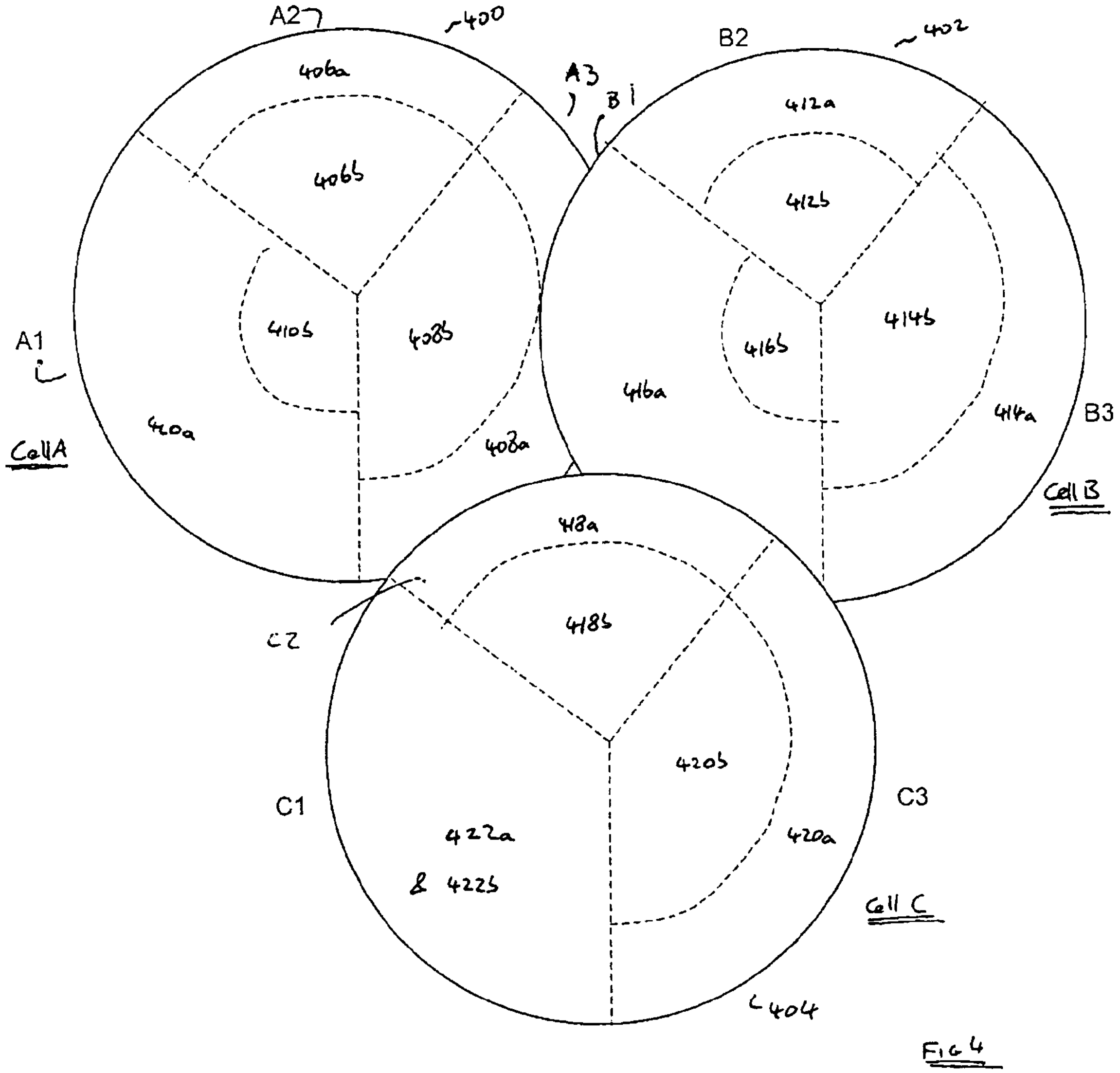
FIG. 4 represents the use of antenna down-tilting in sectors of cells in an exemplary implementation.

By way of further illustration, there is shown in FIG. 4 three cells of a GSM/EDGE network each divided into three sectors, each sector being supported by two antennas. The down-tilt of the respective antennas is controlled in each sector such that effectively two areas of radio coverage are defined. As discussed hereinabove, and as will be discussed in further detail hereinbelow, the interference suppression and frequency planning in each sector is aided by the use of antenna down-tilting in each sector.

In a first sector A1 of a cell A, there is provided an inner area 410*b* and an outer area 410*a*. In a second sector A2 there is provided an inner area 406*b* and an outer area 406*a*. In a third sector A3 there is provided an inner sector 408*b* and an outer sector 408*a*. In cell A in FIG. 4, the boundary between the inner and outer sectors is represented by a dash line. As shown in FIG. 4, for cell A the radius of the dash line differs between sectors, such that the respective sizes of the inner and outer areas in each sector varies. This variation is achieved by controllable down-tilting of the antennas in the sector.

Similarly for cell B there is shown a first sector B1 having an inner area 416*b* and an outer area 416*a*; a second sector B2 having an inner area 412*b* and an outer area 412*a*; and a third sector B3 having an inner area 414*b* and an outer area 414*a*. In a third cell C there is shown a first sector C1 having an overlapping inner area 422*b* and outer area 422*a*; a second sector C2 having an inner area 418*b* and an outer area 418*a* and a third sector C3 having an inner area 420*b* and an outer area 420*a*.

In each of the cells shown in FIG. 4, the outer area represents coverage within the entire sector and is preferably for the broadcast control channel. The dash line of the inner represents the extreme of the radio coverage within the inner area, which area is preferably used for traffic channels within the inner area.

In frequency planning within each sector, the different coverage configurations as shown in FIG. 4 can be taken into account.

In frequency planning using down-tiltable antennas in accordance with the invention, for a two-antenna embodiment, there are effectively three alternatives:

A) design at least two separate frequency lists, one to be used in the whole of the cell area and the other to be used in only part of the cell area. Each list may have different re-use scenarios, B) design a single list and decide the use of available frequencies inside each sector separately, or C) use an automatic network assisted dynamic frequency and channel allocation function, which is aware of interference distribution within a given cell.

The alternative A) is simple in practice, whilst the alternative B) provides more flexibility. Alternative C) is the most flexible but in its effective implementation also the amount of downtilting should be taken into account.

Characteristics of the alternative A), having two separate (dedicated) frequency lists and sub cells with different coverage areas, are consistent with the functionality proposed in intelligent underlay-overlay (IUO) and intelligent frequency hopping (IFH) functionality. IUO is a feature designed to allow a tighter frequency re-use for some of the available radio frequencies and tends to achieve a higher network capacity in terms of handled traffic per cell. The available radio frequencies are split into two (dedicated) groups, a super layer and a regular layer frequency group. The super frequencies are intended for use by mobile stations having a good carrier to interference ratio, while the regular frequencies can be used by all mobile stations. Usually this leads to a system where mobiles near to base stations are directed to the super layer. Moreover, usually a mobile station starts on a regular frequency. In dependence upon the carrier to interference ratio calculated for a given mobile station, the mobile station may then be transferred to the super layer. In the same way, a mobile station already using a super layer may be returned to a regular layer if its carrier to interference ratios deteriorate. In this way, a two-layer cell structure is introduced, in which there is intra cell handovers between the two layers. The handovers between the layers is thus an intelligent frequency hop.

As such, one embodiment of the invention, in line with proposal A) above, combines the definition of two separate frequency lists with the intelligent underlay-overlay and intelligent frequency hopping functionality. Strong antenna down-tilting in the inner layer decreases the interference and therefore tighter frequency re-uses can be used in the inner layer compared to the case with just one antenna for both layers. This increased frequency efficiency can be utilized in increasing capacity and/or quality.

Discussions of intelligent underlay-overlay combined with intelligent frequency hopping in GSM/EDGE systems can be found in, for example, "On The Capacity of a GSM Frequency Hopping Network with Intelligent Underlay-Overlay", Nielsen, Wigard & Mogensen, IEEE 1997, 0-7803-3659-3/97; and "Improved Intelligent Underlay-Overlay Combined with Frequency Hopping in GSM", Wigard, Nielsen, Michaelsen and Mogensen, IEEE 1997, 0-7803-3871-5/97, the contents of both documents which are incorporated herein by reference.

Thus, in one embodiment, an intelligent underlay-overlay with frequency hopping is implemented by supporting frequencies in a super layer on a second antenna having a large down-tilt, and supporting regular frequencies on a first antenna having a relatively smaller down-tilt.

If, in the described embodiment, the second antenna 110 is dynamically tiltable, i.e. the down-tilt angle of the antenna can be changed electronically, then the interference between cells can be controlled depending, for example, on current load conditions. This may be achieved using the alternative B) described hereinabove. It may be particularly advantageously used in order to control the interference caused by "hot-spot" areas. High traffic density areas cause high interference to neighboring cells, in which the same or adjacent frequencies may have been reused. However, by using strong antenna down-tilting for hot-spot traffic, the interference to other cells decreases. In other words, with a strongly down-tilted antenna, it is possible to allow a higher frequency load without increasing the interference in the system. This is not possible with just a single antenna, since at least the broadcast control channel must be transmitted to the whole cell or sector area.

Dynamic frequency and channel assignment (DFCA) is based on time slot alignment provided by network level synchronization. The time slot alignment ensures that the GSM air interface time slots are coincident throughout the network. This makes it possible to take into account all the interference considerations at the time slot level. As GSM/EDGE uses a combination of frequency division multiple access (FDMA) and time division multiple access (TDMA), the radio channel is determined by the frequency and the time slot. When a channel assignment needs to be performed as a result of a newly initiated connection or handover, DFCA evaluates all the possible channels and then chooses the most suitable one in terms of carrier to interference ratio for the assignment. As such, an estimate of the carrier interference ratio is determined for each available radio channel.

As such, the invention may be combined with dynamic frequency and channel assignment. The carrier to interference ratio measured for the assignment of a channel may be taken into account in order to assign a channel associated with an antenna having a relatively large down-tilt, and therefore better interference characteristics than an antenna having a relatively small down-tilt.

A discussion of dynamic frequency and channel assignment can be found in "A Practical DCA Implementation for GSM Networks: Dynamic Frequency and Channel Assignment", Salmenkaita, Gimenez and Tapia, IEEE 2001, 0-7803-6728-6/01, the contents of which are herein incorporated by reference.

The invention, and embodiments thereof, may also be used in combination with downlink diversity techniques. For a given user equipment, the mean powers from separate base station antennas, associated with the same base stations, may not be significantly different. For example, the difference may not be considered significant if the ratio between the mean powers from the different base stations is less than 3 dB. In such a scenario, then diversity transmission techniques, such as which are well known in the art, may work well.

The base station can therefore form a diversity group, and employ transmission diversity for user equipment within such a group. Alternatively in an arrangement where the base station has two groups, one associated with each antenna, the base station may simply include the user equipment in the groups for each antenna.

The user equipment for which downlink diversity is utilized may be determined, for example, based upon the uplink measurements. The mean properties of individual links are approximately the same in both the downlink and uplink directions, although there is a frequency separation, and hence the uplink measurements provide a good basis for making a determination.

Thus a base station may, for example, utilize a threshold (e.g. a level A) and estimate from the uplink signals the mean powers p1 and p2 corresponding to separate antennas of the base stations having different vertical properties. A formula may then be applied, such that, for example, if –AdB<p1/p2<A for a certain user equipment, then transmit diversity is used in downlink transmissions. Other threshold determinations are possible, and an appropriate implementation specific threshold determination may be used.

The effectiveness of the technique in accordance with the invention is improved if it is known which mobiles are within the coverage area of the strongly down-tilted antenna. In most scenarios the coverage area of the strongly down-tilted antenna will incorporate the center of the cell. Rather than frequency grouping, in which selected frequencies are allocated to ones of the antennas within the sector, it is also possible for the invention to be implemented on the basis of mobile grouping. Mobile grouping in a sector can be based on: measured parameters; link parameters; or network parameters. Grouping based on any of these criteria does not raise any new problems.

Antennas having a different down-tilt have different antenna gain in different vertical angles. As such, the average received power can be used as a separation property for mobile stations.

For example, a separation criteria may be based on the fact that if the average received power from a mobile station is larger in the first antenna than in the second antenna, then it is within the coverage area of the first antenna. Conversely if the average received power from the mobile station is larger in the second antenna than in the first antenna, then it is within the coverage area of the second antenna. In this way measured parameters from the mobile station can be used in order to provide a simple mechanism for mobile grouping. The average received power can be estimated using a simple IIR filter:

$$P_1(t) = \alpha \cdot \frac{P_{10}}{P_{10} + P_{20}} + (1 - \alpha)P_1(t - 1)$$

$$P_2(t) = \alpha \cdot \frac{P_{10}}{P_{10} + P_{20}} + (1 - \alpha)P_2(t - 1)$$

where $P_{10}$ and $P_{20}$ are the instantaneous received powers from the first and second antennas respectively, and where $\alpha$ is a filtering parameter. The instantaneous received powers are computer, for example, from channel estimates.

The mobile stations can be grouped on the basis of link parameters using, for example, a link level utility. A base station may monitor the link and select between antennas. The relative distance between the mobile and the base station can be estimated by using the timing advance of the corresponding link. The estimated distance can then be used to group the mobile station with the first or second antenna.

In using a network assisted mode in order to group the mobile stations, some existing network functions may be used. For example, mobile location services can be used to determine the location of the mobile station.

Figure 5:
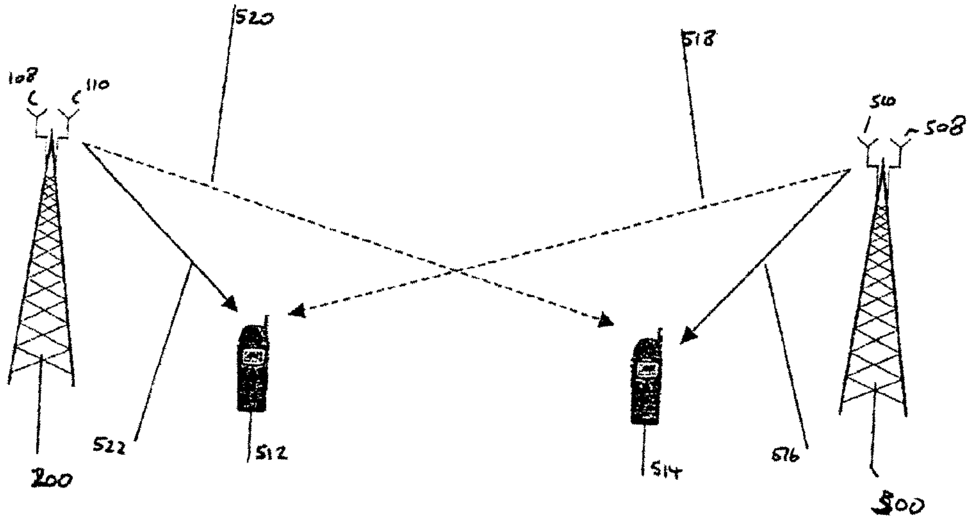
FIG. 5 illustrates the interference advantages obtained by using a heavily down-tilted antenna for selected transmissions in an embodiment.

FIG. 5 provides an exemplary illustration of how the interference between cells is better controlled where two antennas with different down-tilting are used in a given sector. FIG. 5 shows the antenna mast 200 with associated antennas 108 and 110. Similarly there is shown an antenna mast 500 with two antennas 510 and 508 in an adjacent cell. A mobile station 512 is supported by the antenna mast 200, and a mobile station 514 is supported by the antenna mast 500. The mobile stations 512 and 514 are near to the center of their respective cells. Each of the mobile stations 512 and 514 are in communication with the respective base stations using a strongly down-tilted antenna, specifically the second antenna 110 and 510 of the respective base station.

As shown in FIG. 5, the mobile station 512 receives signals represented by arrow 522, which represents the maximum gain direction of the second antenna 110 serving the mobile station 512. Similarly the mobile station 514 receives signals as represented by arrow 516 representing the maximum gain direction of the second antenna 510 serving the mobile station 514. In addition, the mobile station 512 receives interference from the antennas of the antenna mast 500 as represented by dashed arrow 518, and similarly mobile station 514 receives interference from the antennas of the mast 200 as represented by dashed arrow 520. However owing to the relative distance between the inner part of the cell within which the mobile stations 512 and 514 are located, and the transmitter of the other cell, the interference is much reduced compared to the outer part of the cells.

FIG. 5 represents an important advantage of the invention. The co-channel interference is a primary limiting factor in GSM/EDGE networks when the number of available frequencies is not high. The invention provides a means by which interference between cells is decreased, and the re-use of frequencies and frequency hopping can be used more efficiently. This increases the network quality and capacity, especially when the available frequency band is narrow.

The invention preferably advantageously provides means to control interference between cells by coupling together the physical antenna configuration with algorithmic solutions used in intelligent underlay-overlay and intelligent frequency hopping techniques, and in dynamic frequency and channel allocation techniques. The advantage of this is that the control of interference and frequency planning are based both on the utilized antenna configuration and the associated advanced algorithms. Interference reduction can be obtained without any degradation to coverage, which has previously limited the advantage of tilting antennas in conventional antenna configurations.

The invention has been described herein by way of a particular exemplary embodiment in which a sector or cell is provided with two antennas having different angles of down-tilt. The angles of down-tilt may be fixed or one or other of the antennas may have a variable angle of down-tilt. Furthermore the invention is not limited to the provision of two antennas. More than two antennas may be provided in any given sector or cell to thereby provide further control over frequency planning and interference. Furthermore the invention equally applies to the provision of two or more antenna arrays.

The invention is described herein with reference to examples of preferred embodiments for the purpose of illustration, and is not limited to any such embodiments. The scope of the invention is defined by the appended claims.

The invention claimed is:

1. An antenna arrangement comprising:

at least two antennas for providing radio coverage to a plurality of user equipment in a predetermined area of a mobile communications network, the at least two antennas being arranged to have different vertical properties to thereby provide at least two different areas of radio coverage within the predetermined area, and there being provided a plurality of frequencies for use in the predetermined area;

wherein the antenna arrangement is configured to dynamically adjust transmission properties of at least one of the antennas based on a distribution of users within the predetermined area and frequency requirements for users within the predetermined area, to dynamically allocate at least one user equipment to at least one group associated with at least one of the at least two antennas based on link characteristics of a user equipment, and dynamically allocate at least one of said plurality of frequencies to said at least one group, and wherein different frequencies are assigned to different sectors of the coverage area, wherein the different frequencies are assigned to different antennas and multiple antennas are configured to use different frequencies allocated to a shared sector.

2. An antenna arrangement according to claim 1, wherein the at least two groups correspond to a regular layer and super layer of an intelligent underlay-overlay arrangement.

3. An antenna according to claim 1, wherein the plurality of frequencies correspond respectively to a set of regular frequencies and a set of super frequencies.

4. An antenna arrangement according to claim 3, further comprising an intelligent frequency hopping functionality provided between the regular frequencies and the super frequencies.

5. An antenna arrangement according to claim 1, wherein the vertical properties are different down-tilts.

6. An antenna arrangement according to claim 1, wherein the vertical properties are vertical antenna gain figures.

7. An antenna arrangement according to claim 1, wherein the vertical properties of at least one of said antennas is variable.

8. An antenna arrangement according to claim 7, wherein the vertical properties are variable based upon the distribution of user equipment within the predetermined area.

9. An antenna arrangement according to claim 1, wherein the at least one of said plurality of frequencies are allocated based upon a load in a group.

10. An antenna arrangement according to claim 9, wherein the load is dependent upon a number of mobile stations in the group.

11. An antenna arrangement according to claim 9, wherein the load is dependent upon an interference characteristics within the group.

12. An antenna arrangement according to claim 1, wherein frequency allocation to at least one group is dynamically controlled by the network.

13. An antenna arrangement according to claim 1, further comprising a channel which is allocated to the user equipment based on a carrier-to-interference measurement.

14. An antenna according to claim 13, wherein the channel is allocated based on a dynamic frequency and channel assignment.

15. An antenna arrangement according to claim 1, wherein the at least two different antennas provide radio coverage to the user equipment.

16. An antenna arrangement according to claim 15, wherein the user equipment is allocated to at least two groups.

17. An antenna arrangement according to claim 1, wherein a down-tilt of at least one of the antennas is fixed.

18. An antenna arrangement according to claim 1, wherein the predetermined area is a cell.

19. An antenna arrangement according to claim 1, wherein the predetermined area is a sector of a cell.

20. A method, comprising:

arranging at least two antennas to have different vertical properties to thereby provide at least two different areas of radio coverage within a predetermined area;

providing a plurality of frequencies for use in the predetermined area;

dynamically adjusting transmission properties of at least one of the antennas based on a distribution of users within the predetermined area and frequency requirements for users within the predetermined area; and dynamically allocating each user equipment to at least one group associated with at least one of the at least two antennas based on link characteristics of a user equipment, and dynamically allocating at least one of said plurality of frequencies to said at least one group, the method being for controlling an antenna arrangement comprising at least two antennas for providing radio coverage to a plurality of user equipment in the predetermined area of a mobile communications network, and wherein different frequencies are assigned to different sectors of the coverage area, wherein the different frequencies are assigned to different antennas and multiple antennas are configured to use different frequencies allocated to a shared sector.

21. A method according to claim 20, wherein the providing step comprises corresponding the at least two groups to a regular layer and super layer of an intelligent underlay-overlay arrangement.

22. A method according to claim 21, wherein the providing step comprises corresponding the plurality of frequencies to a set of regular frequencies and a set of super frequencies, respectively.

23. A method according to claim 22, further comprising the step of providing an intelligent frequency hopping functionality between the regular layer and the super layer.

24. A method according to claim 20, wherein the arranging step comprises arranging the at least two different antennas to have different vertical properties, wherein the vertical properties of at least one of said antennas is variable.

25. A method according to claim 24, wherein the arranging step comprises arranging the at least two different antennas to have different vertical properties based upon the distribution of user equipment within the predetermined area.

26. A method according to claim 25, wherein the allocating step comprises allocating an available frequency based upon a load in a group.

27. A method according to claim 20, further comprising allocating a channel to the user equipment based on a carrier-to-interference measurement.

28. A method according to claim 27, wherein the channel allocating step comprises allocating based on a dynamic frequency and channel assignment.

29. An antenna arrangement, comprising:

at least two antennas for providing radio coverage to a plurality of user equipment in a predetermined area of a mobile communications network, the at least two antennas being arranged to have different vertical properties to thereby provide at least two different areas of radio coverage within the predetermined area, and there being provided a plurality of frequencies for use in the predetermined area;

adjusting means for dynamically adjusting transmission properties of at least one of the antennas based on a distribution of users within the predetermined area and frequency requirements for users within the predetermined area; and allocating means for dynamically allocating at least one user equipment to at least one group associated with at least one of the at least two antennas based on link characteristics of a user equipment, and for dynamically allocating at least one of said plurality of frequencies to said at least one group, and wherein different frequencies are assigned to different sectors of the coverage area, wherein the different frequencies are assigned to different antennas and multiple antennas are configured to use different frequencies allocated to a shared sector.

* * * * *